US008453565B2

(12) United States Patent
Luedemann et al.

(10) Patent No.: US 8,453,565 B2

(45) Date of Patent: Jun. 4, 2013

(54) PRESSING STATION IN A ROTARY PRESS

(75) Inventors: Stefan Luedemann, Hamburg (DE); Kurt Marquardt, Hamburg (DE); Jan Naeve, Gudow (DE)

(73) Assignee: Fette GmbH, Schwarzenbek (DE)

(*) Notice: Subject to any disclaimer, the term of this patent is extended or adjusted under 35 U.S.C. 154(b) by 486 days.

(21) Appl. No.: 12/751,327

(22) Filed: Mar. 31, 2010

(65) Prior Publication Data

US 2010/0251909 A1 Oct. 7, 2010

(30) Foreign Application Priority Data

Apr. 4, 2009 (DE) ........................ 10 2009 016 406

(51) Int. Cl.
*F16C 13/00* (2006.01)

(52) U.S. Cl.
USPC ...................................... 100/155 R; 100/168

(58) Field of Classification Search
USPC 100/155 R, 164, 168, 169, 170, 176; 72/181, 72/245, 246; 425/367
See application file for complete search history.

(56) References Cited

U.S. PATENT DOCUMENTS

| | | | | |
|---|---|---|---|---|
| 2,578,594 | A * | 12/1951 | Putnam | 100/166 |
| 3,367,262 | A * | 2/1968 | Stevens et al. | 100/162 R |
| 5,044,916 | A | 9/1991 | Wunder, Sr. | |
| 5,151,280 | A | 9/1992 | Arndt et al. | |
| 5,229,044 | A | 7/1993 | Shimada et al. | |
| 5,321,969 | A | 6/1994 | Bakermans | |
| 5,733,589 | A * | 3/1998 | Oki | 425/364 R |
| 6,209,374 | B1 * | 4/2001 | Bradbury et al. | 72/181 |

FOREIGN PATENT DOCUMENTS

| | | |
|---|---|---|
| DE | 10 2005 030 312 A1 | 12/2006 |
| DE | 10 2006 017 196 A1 | 10/2007 |
| EP | 1844924 | 10/2007 |
| FR | 2872447 | 1/2006 |
| JP | 2003071599 | 3/2003 |
| JP | 2005-224831 A | 8/2005 |

* cited by examiner

*Primary Examiner* — Jimmy T Nguyen
(74) *Attorney, Agent, or Firm* — Vidas, Arrett & Steinkraus, P.A.

(57) ABSTRACT

A pressing station in a rotary press having a bearing component for a compression roll that can be adjusted vertically in height along a guide attached to the frame of the rotary press, a first adjustment drive fastened to the frame, which is coupled via an adjustment drive to the bearing component for height adjustment of the bearing component, wherein a shaft or axle for the compression roll or the bearing component or a part of these is coupled to a second adjustment drive in such a way that the compression roll can be adjusted in its height independently from the first adjustment drive.

5 Claims, 1 Drawing Sheet

PRESSING STATION IN A ROTARY PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

A rotary press has at least one upper and one lower pressing station with at least one compression roll. The compression rolls act on the upper and lower punch in order to press the powdered material filled into die holes. The compression rolls are typically mounted in a rotational manner in a stable bearing component. Because the thickness of as for example a tablet is predetermined, a corresponding setting of at least the upper compression roll is required in order to attain the desired thickness dimension (base height). Therefore, to be able to produce different pellet thicknesses on a rotary press, it is known to make the bearing component vertically adjustable in height using an adjustment drive and an adjustment gear. Because the height of the compression roll must attain a very precise setting, the gear ratio of the adjustment gear is very high. Thus, a large number of rotations of a rotating drive motor are necessary in order to make a millimeter adjustment. Therefore, it takes considerable time to move a compression roll to another dimension.

It is also known to use rotary presses for producing multilayer tablets. The first layer is pressed in a first pressing station, before the second layer is filled. With three layers, the second layer is also pressed in a further pressing station before the complete compression of all three layers takes place in a third pressing station. For the final compression, typically two compression rolls are used after each other (pre-compression and main compression station).

During production startup for a new multilayer tablet, samples are withdrawn for the individual layers. Such sampling is necessary; in particular, to determine the effects on the filling, the individual layers and with it, the portion of active agent, before the production of multilayer tablets is started. However, because only a light pressing occurs in each case at the respective pressing stations for the first layers of a multilayer tablet, in each case, it is not possible to lift the layer out of the die hole and strip it off without destroying it. Therefore, it is known, through adjustment of the corresponding compression roll to press the layer being sampled with more force, if it is to be produced individually and ejected. Depending on the requirement of the compression force, the compression roll must be moved by a desired distance. During the adjustment of the compression roll while withdrawing samples, the pressing force increases only very slowly due to the slow travel speed of the compression roll. The drive motor requires a multiplicity of rotations in order to move the compression roll, for example, by 1 or 2 mm. However, this slow movement speed affects the filling of the layer sample and leads to an erroneous layer sample weight. The production of production tablets is otherwise based on the erroneous layer weight and can lead to incorrect concentrations of the active agent.

Therefore, the object of the invention is to create a pressing station that enables rapid adjustment of the compression roll for withdrawing samples.

BRIEF SUMMARY OF THE INVENTION

With the pressing station according to the invention, a shaft or axle for the compression roll, or the bearing component or a part thereof is coupled to a second adjustment drive such that the height of the compression roll can be adjusted independently from the first adjustment drive.

With the pressing station according to the invention, the compression roll can be precisely adjusted to a desired height dimension using the first adjustment drive. Using the second adjustment drive the compression roll or its bearing component can also be moved, and at that, with relatively high speed. Consequently, the pressing station according to the invention enables a slow step-less positioning of the compression roll, as well as a fast step-wise positioning while taking into account high position accuracy over the entire adjustment range. The positioning can occur with or without load.

Different design possibilities are conceivable to couple a second adjustment drive to the bearing component or the axle or shaft of the compression roll such that the desired movement can take place at the desired speed. For this, one embodiment of the invention provides that the axle of the compression roll is eccentrically mounted in the bearing component, and a linear drive engages eccentrically at the axle for the purpose of rotation of the axle in the bearing component. The eccentricity of the axle only needs to be minimal, because a movement by a distance of 2 mm to 3 mm is completely sufficient for withdrawing samples.

In connection with this, a further embodiment of the invention provides that a sleeve-shaped eccentric bolt is mounted in the bearing component, which in turn, supports the compression roll in a rotationally manner. A disc-shaped section of the eccentric bolt, accessible from outside, is mounted in a rotational manner in a section of the bearing component. It has a curved slot in which a stop that is connected to the bearing section engages. The length of the slot in the disc-shaped section of the eccentric bolt determines the maximum displacement distance of the compression roll. The linear drive can engage eccentrically at the disc-shaped section. In order to vary the displacement distance, a further embodiment of the invention provides that a second stop in the slot can be connected to the bearing section in different positions.

The linear drive is preferably a pneumatic cylinder.

Instead of the described eccentric drive, it is also possible according to one embodiment of the invention to provide a short stroke cylinder or piezoelectric element that acts between the bearing component and a bearing bolt for the compression roll, in order to move the compression roll in height relatively quickly by a predetermined distance. For this, it is necessary that the bearing bolt can be slid vertically in the bearing component.

DETAILED DESCRIPTION OF THE FIGURES OF THE DRAWINGS

An exemplary embodiment of the invention is explained in the following in more detail using the drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated In the Figures, a compression roll 10, as it is used in a pressing station of tablet presses or similar, is represented. The design and configuration of the compression roll 10 will not be discussed in more detail, because these are known. Instead of a compression roll, a pressure rail can also be used.

Figure 4:
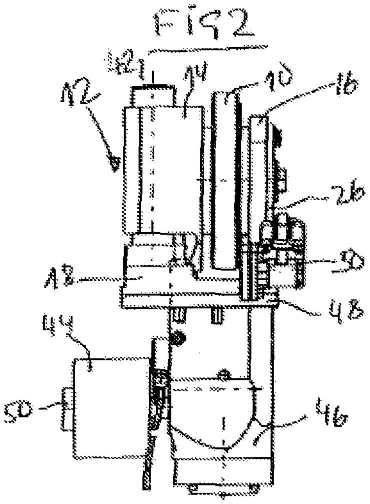
FIG. 4 shows a further lateral view of the pressing station according to FIG. 1.

The compression roll 10 is rotatably mounted in a bearing component 12. The bearing component consists of a first bearing section 14 and a second bearing section 16, which are fixedly connected together at the lower end at 18 (see FIG. 4). The sections 14, 16, 18 form a bearing fork for the compression roll 10. Such a design is known. For supporting the compression roll 10, an eccentric bolt 22 extends into the two bearing sections 14, 16. A bolt 20, which extends through the eccentric bolt serves to axially secure the eccentric bolt 22, which for its part is guided through the bearing section 16, and is inserted in a recess of the bearing section 14. The eccentric bolt 22 supports the compression roll 10 through a roll bearing 24. The eccentric bolt 22 has a disc-shaped section 26 that is accessible from outside, which is received, rotatably, in a corresponding circle-shaped recess of the bearing section 16. A pneumatic linear drive 30 eccentrically engages at 28 with the disc-shaped section 26.

Figure 1:
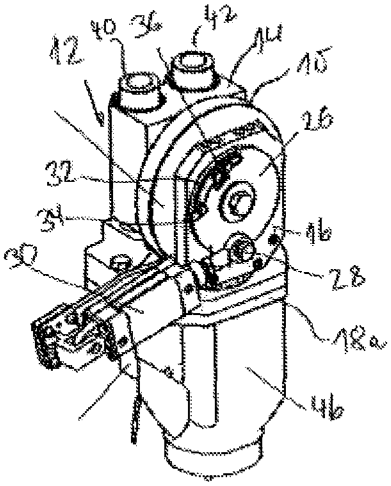
FIG. 1 shows a perspective view of a pressing station according to the invention.
Figure 2:
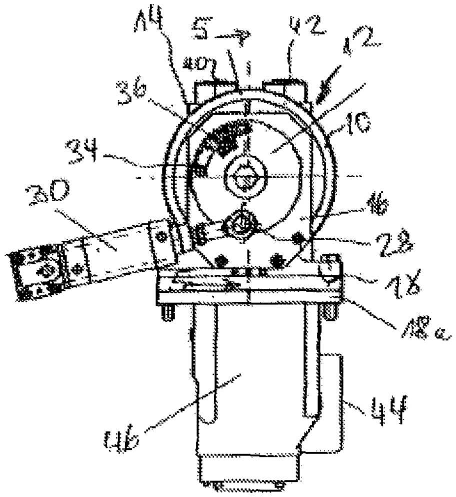
FIG. 2 shows a lateral view of the pressing station according to FIG. 1.
Figure 3:
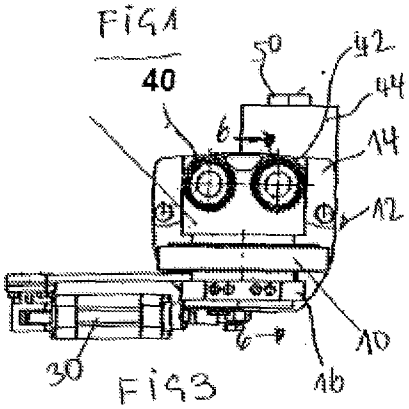
FIG. 3 shows a top view of the pressing station according to FIG. 1.

As highlighted in FIGS. 1 and 2, the disc-shaped section 26 has an arc-shaped slot 32, into which a first stop pin 34 extends, and a second stop 36, which can be fastened to the bearing section 16 using threaded pins. The stop 34 can also be formed by a stop pin.

The two bearing sections 14, 16, and the connecting section 18 together with the compression roll 10, form a unit that is precisely guided in height along the guides 40, 42.

An adjustment motor 44 is coupled to an adjustment gear 46, which is connected to the frame of the tablet press, not shown, via a flanged connection 18*a*. An adjustment element, not shown, at the output of the adjustment gear 46 adjusts the height of the bearing component 12 along the guides 40, 42. The gear ratio of the adjustment gear is extraordinarily large such that a large number of rotations of the drive motor 44 are necessary in order to realize only a small adjustment distance of the compression roll 10. In order to be able to measure the adjustment distance, a sensor 50 is assigned to the adjustment motor, and determines the adjustment distance using the rotations of the motor 44.

Thus, the compression roll 10 can be adjusted with the bearing component 12 and the eccentric. During operation, the compression roll 10 can be moved delicately by means of the adjustment gear 46, and step-wise by means of the eccentric adjustment using the eccentric bolt 22 and the linear drive 30. The structure shown is designed such that an exact position adjustment of the pressure roll 10 is possible with, as well as without, pressing force.

For stronger compression of a layer sample, the base height of the tablets must be reduced in the shortest possible time in order to avoid product loss and erroneous weights of the layer sample. This is realized through the actuation of the eccentric bolt 22 using the cylinder 30. After the completion of layer sampling, the eccentric adjustment is returned to the starting position, as is shown in FIG. 1. Thereby, the base height is readjusted to the original base height. After the sampling has completed, the adjustment gear 46 handles the delicate control of the base height of the tablets that is required during production.

Therefore, with the invention a combination of a slow, step-less, precise positioning and a fast, step-wise positioning is achieved. Thus, during operation the height precision does not suffer, while the time for performing sampling can be greatly reduced with a minimum of waste of tablet material.

Figure 5:
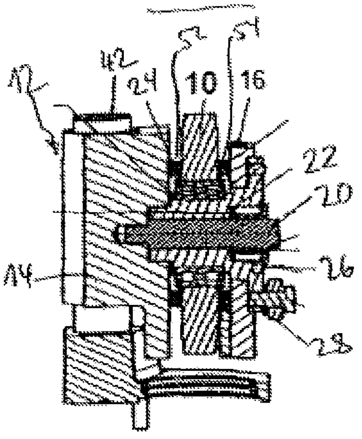
FIG. 5 shows a section through the representation according to FIG. 2 along the line 5-5.
Figure 6:
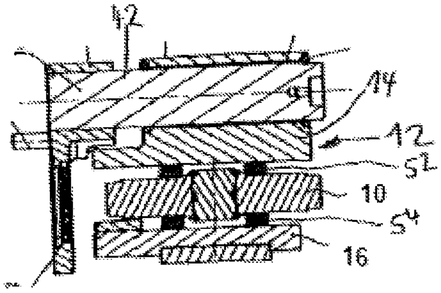
FIG. 6 shows a section through the representation according to FIG. 3 along the line 6-6.

In the FIGS. 5 and 6, seals 52, 54 can be seen between the bearing sections 14, 16 and the compression roll 10. These seals are intended to prevent impurities from penetrating into the roll bearing 24.

With the described eccentric adjustment of the compression roll 10, it cannot be avoided that the compression roll also changes its position laterally. However, this change of position is so minimal that effects on the pressing operation while withdrawing layer samples can be ignored.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A pressing station in a rotary press comprising:

a bearing component for a compression roll that can be adjusted vertically in height along a guide attached to a frame of the rotary press;

a first adjustment drive fastened to the frame, the first adjustment drive is coupled via an adjustment gear to the bearing component for height adjustment of the bearing component, wherein a shaft or axle of the compression roll, or the bearing component or a part of this is coupled to a second adjustment drive in such a way that the compression roll can be adjusted in its height independently from the first adjustment drive, wherein the second adjustment drive is a linear drive, and further wherein the axle of the compression roll is eccentrically mounted in the bearing component, and the linear drive engages eccentrically at the axle for the purpose of rotation of the axle in the bearing component.

2. The pressing station according to claim 1, wherein in the bearing component (12) a sleeve-shaped eccentric bolt (22) is mounted, which for its part rotatably supports the compression roll (10), and a disc-shaped section (26), which can be accessed from outside; of the eccentric bolt (22), is rotatably mounted in a section (16) of the bearing component (12), and has an arc-shaped slot (32), in which at least one stop (34, 36) engages that is connected to the bearing section (16).

3. The pressing station according to claim 2, wherein a stop pin or a stop segment is screwed to the bearing section (16).

4. The pressing station according to claim 2, wherein a second stop (36) in the slot (32) can be connected to the bearing section (16) in different positions.

5. The pressing station according to claim 1, wherein a bearing bolt for the compression roll is mounted, movable in height, in the bearing component, and a short stroke cylinder or a piezoelement acts together with the bearing bolt in order adjust its height.

* * * * *